United States Patent
Inturi et al.

(10) Patent No.: US 9,263,066 B1
(45) Date of Patent: Feb. 16, 2016

(54) DATA WRITER WITH MAGNETICALLY HARD FRONT SHIELD

(71) Applicant: Seagate Technology LLC, Cupertino, CA (US)

(72) Inventors: Venkateswara Inturi, Shakopee, MN (US); Lei Lu, Bloomington, MN (US); Joseph M. Mundenar, Eden Prairie, MN (US); Huaqing Yin, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/702,455

(22) Filed: May 1, 2015

(51) Int. Cl.
*G11B 5/127* (2006.01)

(52) U.S. Cl.
CPC ...................................... *G11B 5/127* (2013.01)

(58) Field of Classification Search
CPC ............ G11B 5/127; G11B 5/147; G11B 5/33
USPC .................. 360/125.1–125.7, 125.31–125.35
See application file for complete search history.

(56) References Cited

U.S. PATENT DOCUMENTS

| 4,656,546 | A  |    4/1987 | Mallory |
| 7,446,980 | B2 |   11/2008 | Le |
| 7,477,481 | B2 |    1/2009 | Guthrie et al. |
| 7,821,736 | B2 |   10/2010 | Che et al. |
| 8,582,241 | B1 * | 11/2013 | Yu et al. .................... 360/125.43 |
| 8,780,499 | B2 |    7/2014 | Hsiao et al. |

* cited by examiner

*Primary Examiner* — Allen T Cao
(74) *Attorney, Agent, or Firm* — Hall Estill Attorneys at Law

(57) ABSTRACT

A data writer can be configured with at least a write pole separated from a front shield by a non-magnetic gap layer. The front shield may consist of at least a seed layer and a shielding layer with the shielding layer having an easy axis coercivity along a first direction of 4 Oe or more and a hard axis coercivity along a second direction of 0.5 Oe or more.

20 Claims, 3 Drawing Sheets

DATA WRITER WITH MAGNETICALLY HARD FRONT SHIELD

SUMMARY

A data writer, in some embodiments, has a write pole separated from a front shield by a non-magnetic gap layer. The front shield consists of seed and shielding layers with the shielding layer having an easy axis coercivity along a first direction of 4 Oe or more and a hard axis coercivity along a second direction of 0.5 Oe or more.

DETAILED DESCRIPTION

Increased industry and consumer demand for data storage devices with higher data capacity has reduced the physical size of data tracks on a data storage medium. Such smaller data tracks can be susceptible to unwanted data erasure when a data writer inadvertently positions magnetization beyond the intended bounds of a write pole. The saturation of data writer shields can inadvertently create erasure conditions on the same data track that is being written by the write pole (on-track erasure) and/or on a different data track than the one being accessed by the write pole (off-track erasure). A reduction and elimination of on-track and off-track erasure conditions can optimize data writing and data storage device performance.

Accordingly, a data writer can have a write pole separated from a front shield by a non-magnetic gap layer with the front shield consisting of seed and shielding layers where the shielding layer has an easy axis coercivity along a first direction of 4 Oe or more and a hard axis coercivity along a second direction of 0.5 Oe or more. The tuned material construction of the seed layer allows the shielding layer to have a higher magnetic coercivity and greater grain size with no reduction in magnetic moment. The ability to construct a magnetically hard shielding layer corresponds with less magnetization being transferred away from the write pole in on-track and off-track directions.

Figure 1:
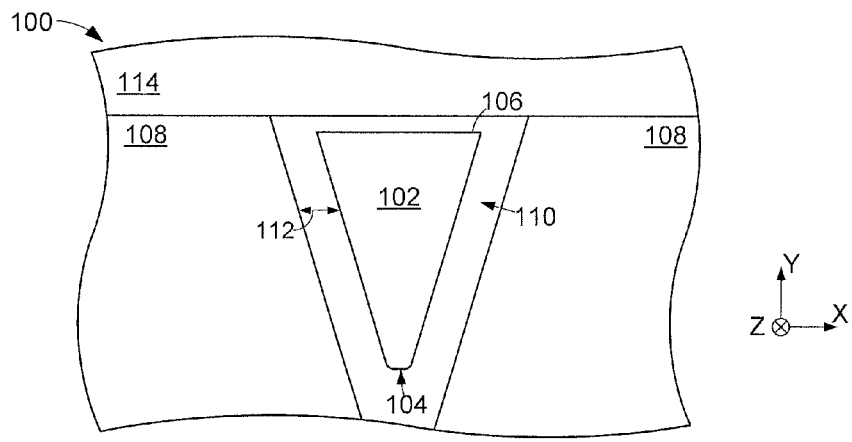
FIG. 1 is an air bearing view line representation of a portion of an example data writer arranged in accordance with some embodiments.

It is noted that the various embodiments of the present disclosure are directed to data writer applications in a hard disk drive data storage device; however, such arrangement is not required or limiting. In FIG. 1, an air bearing surface (ABS) portion of an example data writer 100 is shown in accordance with some embodiments. The data writer 100 has a write pole 102 that can be shaped, such as with partially or completely linear or curvilinear sidewalls to define rectangular, rhomboid, or trapezoidal shapes on the ABS.

As displayed, the writer pole 102 has a trapezoidal shape on the ABS with a leading tip 104 and a trailing edge 106, as designated by when data bits are encountered by the write pole 102. That is, the terms "front" and "trailing" are synonymous relative descriptors meant to denote position relative to moving portions of an adjacent data storage medium. Hence, the leading tip 104 will pass over a portion of a data storage medium before the trailing edge 106 when the data storage medium rotates in a first direction along the Y axis.

Although it is contemplated that a data writer can be configured to accurately write data bits when the adjacent data storage medium is rotating in any direction, the trapezoidal shape of the write pole 102 is tuned for use while the data storage medium is rotating so that the leading tip 104 encounters a data bit before the trailing edge 106. The write pole 102 is separated from side shields 108 along a lateral (cross-track) direction parallel to the X axis by a non-magnetic gap material 110, such as Alumina ($Al_2O_3$). The gap material 110 may be formed of one or more layers that continuously surround the write pole 102 with a uniform or varying gap distance 112 to separate the write pole 102 from side 108 and front 114 shields.

The gap material may separate the write pole 102 from side shields 108 by a lesser, or greater, distance 112 than from the front shield 114. A thin or decreasing gap distance 112 between the write pole 102 and shields 108 and 114 brings the shields 108 and 114 closer to the write pole 102, which may increase the magnetic resolution of the data writer 100, but can degrade writer 100 performance. For instance, a small gap distance 112 can promote shunting and flux leakage from the write pole 102 to the front 114 and/or side 108 shields, which brings transfers magnetization away from the write pole 102 and increases the risk of on-track and off-track erasure conditions occurring.

Figure 2:
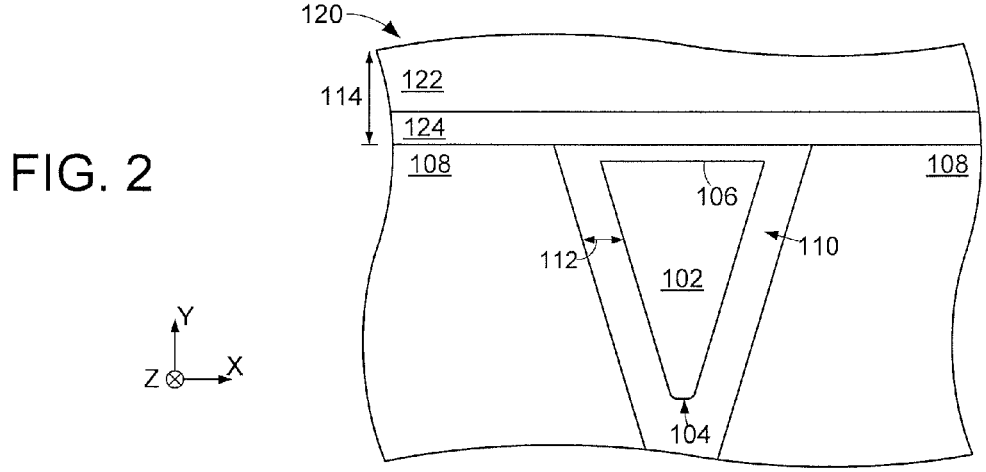
FIG. 2 displays an air bearing view line representation of a portion of an example data writer configured in accordance with various embodiments.

FIG. 2 displays an ABS view line representation of a portion of an example data writer 120 that is tuned in accordance with some embodiments to provide a balance between shielding and data bit writing performance. The data writer 120 positions the write pole 102 between the side shields 108 and uptrack from the front shield 114. While assorted embodiments configure the front shield 114 as a single layer of magnetic material, such as FeCo, that has a high magnetic permeability and low coercivity. Such soft shield material can easily saturate and distribute magnetization away from the write pole 102. Hence, the front shield 114 is constructed, in various embodiments, with a shielding layer 122 formed atop a seed layer 124 that promotes high magnetic coercivity, low magnetic permeability, and large grain size in the shielding layer 122.

In some embodiments, the seed layer 124 is constructed of the same material as the shielding layer 122, but with different coercivity. For example, the seed layer 124 can comprise CoFe with lower permeability and higher coercivity than the shielding layer 122, which may be a result of processing conditions like annealing. It is contemplated that the seed layer 124 is configured with a relatively high anisotropy field, such as 20 Oe or more. The tuned material construction of the seed layer 124 produces larger easy and hard axis coercivities for the shielding layer 122, which increases the robustness of the front shield 114 and the performance of the data writer 120. That is, the shielding layer 124 can be tuned to produce an easy magnetization axis coercivity (Hce) of 4 Oe or more, such as 13 Oe, and a hard magnetization axis coercivity (Hch) of 0.5 Oe or more, such as 2.5 Oe.

It is noted that some seed materials, such as platinum-group metals like Ru and Ta, can degrade the magnetic moment of the shielding layer 122. However, the use of FeCo, FeCoHf, or $Al_2O_3$ for the seed layer 124 can maintain the moment of the FeCo shielding layer materials, such as 2.2-2.4 T. The increased coercivity of the shielding layer 122 can be, at least partially, attributed to the increased grain size of the layer 122 compared to if the shielding layer material was deposited without a seed layer or with a seed layer constructed of a non-optimal material, such as Cr, Ta, W, Mo and Nb. By depositing the shielding layer 122 on a single continuous seed layer 124 of FeCo, FeCoHf, or $Al_2O_3$, having varying properties, like coercivity, grain size, and permeability while maintaining high magnetic moment, the shielding layer 122 forms varying magnetic and physical properties.

Figure 3:
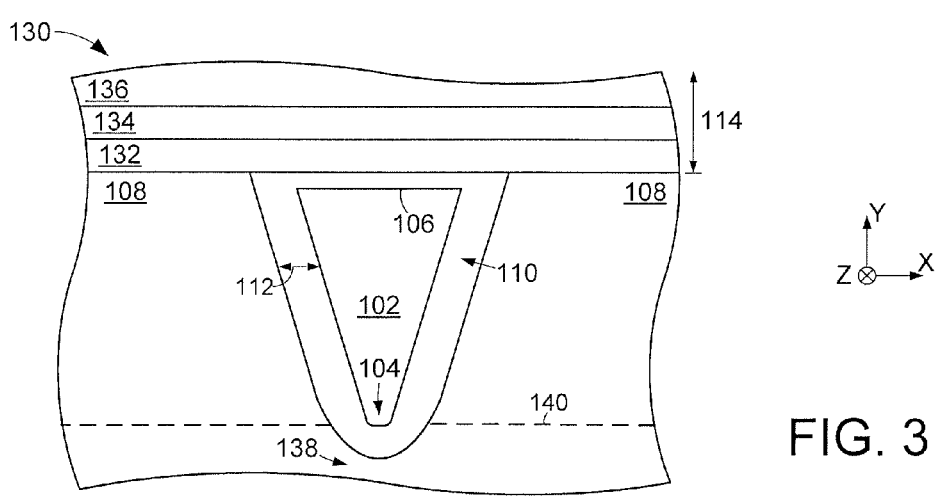
FIG. 3 shows an air bearing view line representation of a portion of an example data writer arranged in accordance with some embodiments.

Although the shielding layer 122 is positioned atop a single seed layer 124 in data writer 120, such configuration is not required or limiting. FIG. 3 illustrates an ABS view line representation of a write pole 102 portion of an example data writer 130 configured with multiple front shield 114 seed layers in accordance with some embodiments. As shown, the front shield 114 has first 132 and second 134 layers that may be constructed of the same, or different materials, that allow the magnetic characteristics of the shielding layer 136 to be tuned.

The respective seed layers 132 and 134 may have different thicknesses, as measured parallel to the Y axis on the ABS. The tuned configuration of the seed layer thicknesses can provide increased control of the magnetic characteristics of the shielding layer 136, such as the hard axis coercivity, compared to tuning the seed layers 132 and 134 to be different materials. Assorted embodiments can tune the overall thickness of the seed structure by successively depositing multiple layers of the same material, such as Alumina. A first embodiment stacks two seed materials while other embodiments stack four seed materials atop one another.

The ability to manipulate the magnetic characteristics of the shielding layer 136 by tuning the materials, number of layers, and thicknesses of various seed layers 132 and 134 allows the front shield 114 to be customized to accommodate a variety of different data storage environments with elevated coercivity and grain size along with acceptable magnetic moments. The tuned configuration of the front shield 114 can complement a wrap-around, or box, shield that positions shielding material at an uptrack 138 location relative to the write pole 102. It is contemplated that the wrap-around shield is constructed of extensions of the side shields 108, or as a separate leading shield layer, as designated by segmented line 140.

Figure 4:
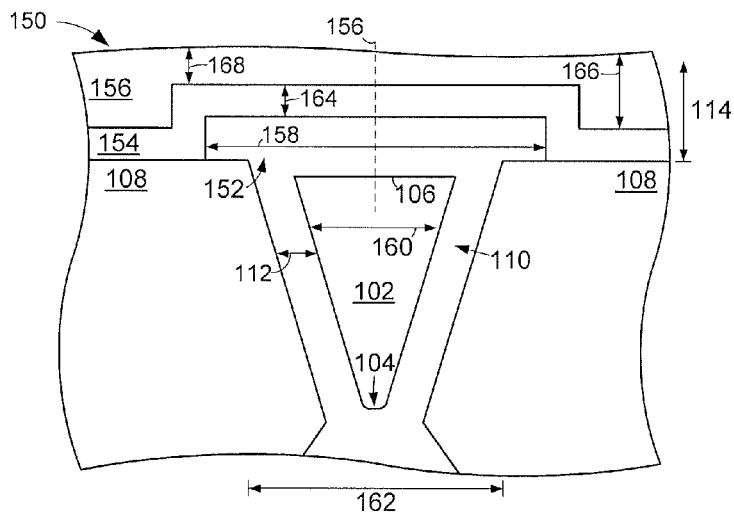
FIG. 4 illustrates an air bearing view line representation of a portion of an example data writer configured in accordance with various embodiments.

With the combination of tuned shields partially or completely surrounding the write pole 102, the data writer 130 can experience optimized performance for some data storage conditions. However, increasing magnetic field strength in the write pole 102 can increase the risk for at least the front shield 114 to be saturated and produce on-track and off-track erasure conditions. FIG. 4 displays an air bearing view line representation of a portion of an example data writer 150 configured in accordance with assorted embodiments to arrange the front shield 114 with a letterbox region 152 that increases the amount of non-magnetic gap material 110 between the trailing edge 106 and the seed layer 154 along a longitudinal axis 156 of the write pole 102 that symmetrically bifurcates the write pole 102 on the ABS.

The letterbox region 152 can be configured with any shape and size, but various embodiments provide a letterbox width 158 that is larger, in the cross-track direction parallel to the X axis, than the write pole width 160, gap distance 110, and aggregate width 162 between the side shields 108 proximal the trailing edge 106. The increased letterbox width 158 compared to the aggregate width 162 reduces the risk of a magnetic flux pathway forming at the trailing corners of the write pole 102. For example, the letterbox width 158 can be tuned to reduce the formation of flux pathways from the trailing edge 106 to the side 108 and front 114 shields, respectively.

The notched configuration of the letterbox region 152 in the front shield 114 can alter the deposited shape of the seed 154 and shielding 156 layers of the front shield. As shown, the seed layer 154 can have a varying thickness 164, as measured parallel to the Y axis, that corresponds with a varying shielding layer thickness 166 along the cross-track direction and relative to the longitudinal axis 156. That is, the shielding layer 156 can have a greater thickness 166 distal the longitudinal axis 156 and a smaller thickness 168 proximal the longitudinal axis 156, which acts in concert with the varying thickness 164 of the seed layer 154 to separate the write pole 102 from the magnetic material of the shielding layer 156.

Figure 5:
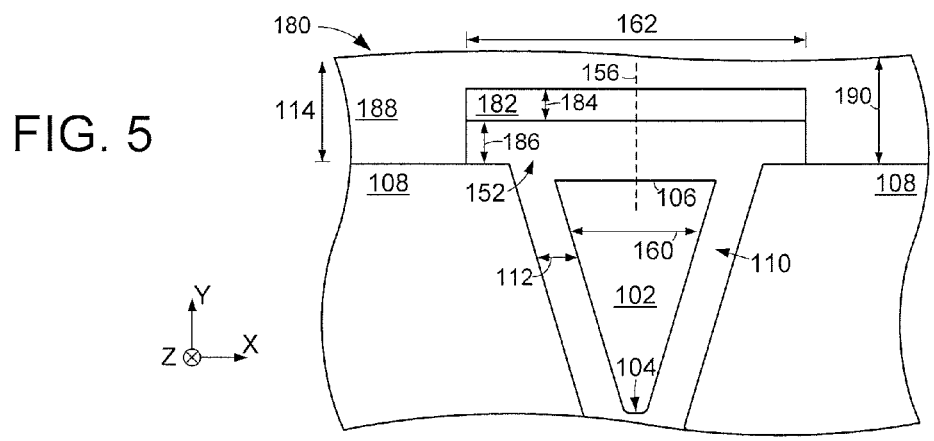
FIG. 5 depicts an air bearing view line representation of a portion of an example data writer arranged in accordance with some embodiments.

It is contemplated that the thicknesses 164 and 166 of the seed 154 and shielding 156 layers are each uniform along the cross-track direction with at least one layer positioned laterally adjacent to the letterbox region 152. FIG. 5 illustrates an air bearing view line representation of a portion of an example data writer 180 that configures the front shield 114 in accordance with some embodiments to localize a seed layer 182 to the letterbox region 152. In the non-limiting embodiment of FIG. 5, the seed layer 182 has the same width 162 and a different thickness 184 than the letterbox region 152. The seed thickness 184 can act in concert with the letterbox thickness 186 to separate the trailing edge 106 of the write pole 102 from the shielding layer 188 along the downtrack direction.

The localization of the seed layer 182 to the letterbox region 152 allows the shielding layer 188 to have a varying thickness 190 that continuously extends to contact the side shields 108, which can correspond to inter-shield coupling and increased shield volume to dissipate stray magnetic fields. It is noted that configuring the seed layer 182 and letterbox region 152 to each be symmetrical about the longitudinal axis 156 can provide generally symmetric cross-track shielding behavior. However, some embodiments arrange the front shield to be asymmetric about the longitudinal axis 156, which can produce asymmetric magnetic field shielding about the write pole 102 that is conducive to various data storage environments, such as shingled magnetic recording data storage devices.

Figure 6:
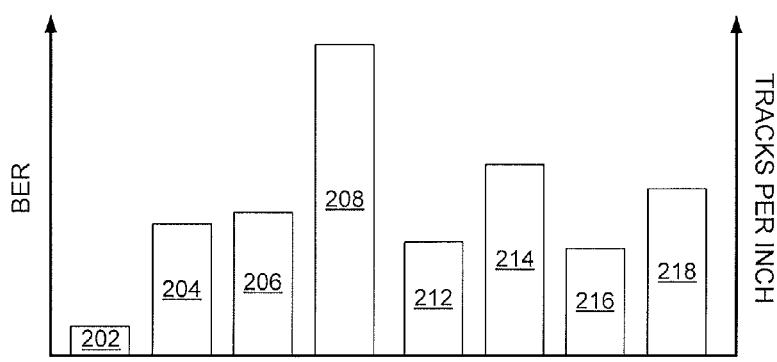
FIG. 6 graphs modeled operational data corresponding to various data writer configurations.

Through the assorted tuning of front shield 114 materials, shapes, sizes, and features, the data writing characteristics of a data writer can be customized. FIG. 6 graphs various example operational data for the bit error rate and tracks per inch of various front shield seed configurations. Bars 202, 204, 206, and 208 respectively correspond to different front shield 114 seed layer materials onto which a FeCo shielding layer is deposited and their correlation to the loss of bit error rate of a data storage device.

Bar 202 represents an unseeded FeCo seed material while bar 204 represents a seed lamination of four $Al_2O_3$ layers. Bar 206 illustrates the loss of bit error rate of a FeCoHf seed layer material and bar 208 represents FeCo seed material with a high anisotropy field ($H_k$). The various losses of bit error rates of the assorted seed layer materials can be selected with the number of tracks per inch capability, as illustrated by bars 212, 214, 216, and 218. An unseeded FeCo seed layer material is shown by bar 212. Bar 214 corresponds with the $Al_2O_3$ lamination of four layers while bar 216 represented an FeCoHf seed layer material and bar 218 plots the tracks per inch of a high $H_k$ FeCo seed material.

Figure 7:
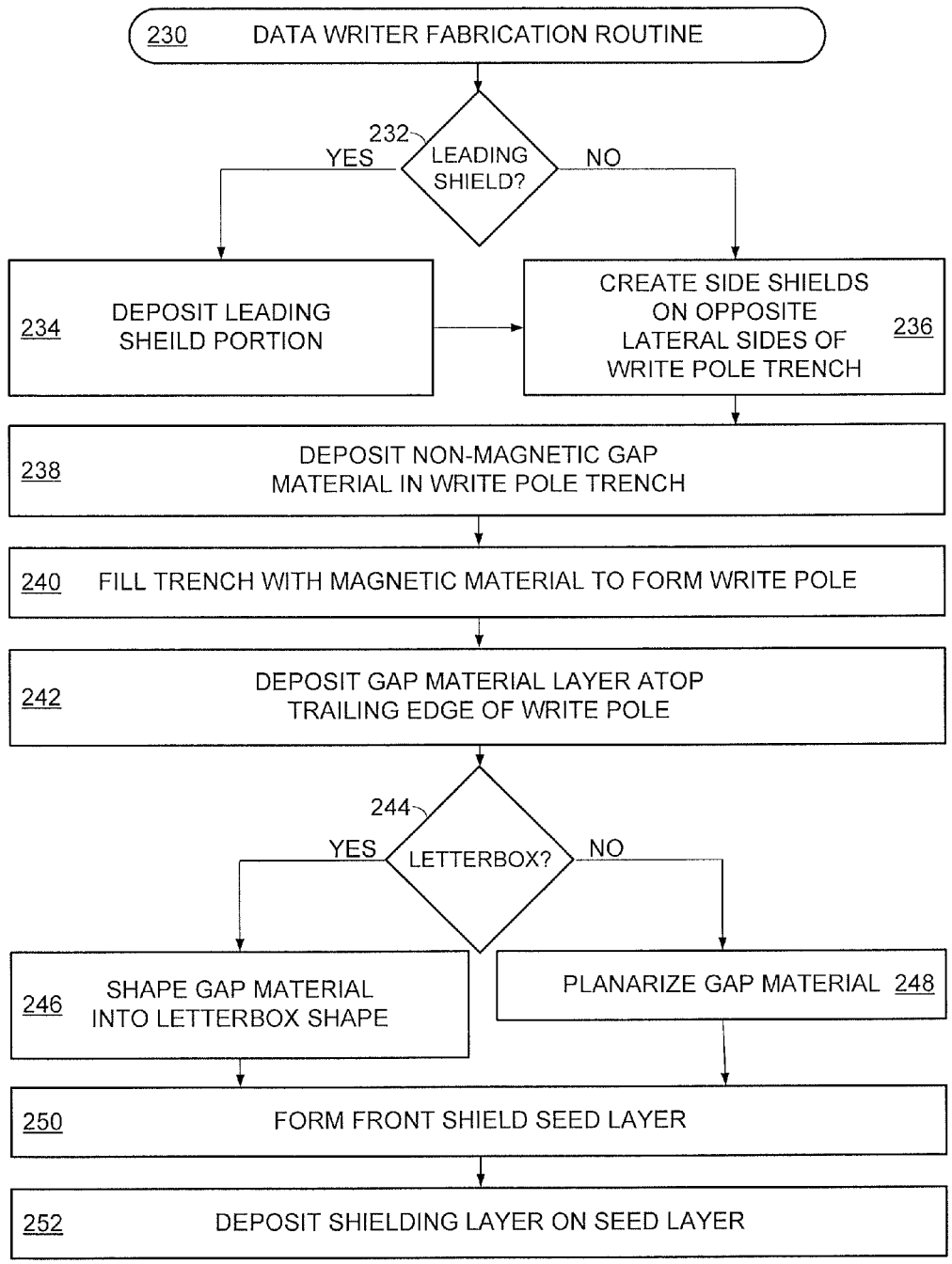
FIG. 7 plots an example data writer fabrication routine that may be carried out in accordance with various embodiments.

FIG. 7 plots an example data writer fabrication routine 230 that can be carried out in accordance with various embodiments to tune the magnetic characteristics of a data writer. Initially, routine 230 determines if a wrap-around leading shield is to be implemented in decision 232. If a wrap-around leading shield is chosen, step 234 proceeds to deposit a leading shield either as an individual layer of material or as part of a side shield structure. In the event a wrap-around leading shield is not chosen, or during step 234, side shields are created on opposite sides of a write pole trench in step 236.

Next, non-magnetic gap material is deposited in step 238 to continuously coat the write pole trench that allows step 240 to fill the trench with magnetic material that forms a write pole. It is noted that the write pole, gap material, and side shields can be individually and collectively shaped to be similar, or dissimilar, to the embodiments shown in FIGS. 1-5. The formation of the write pole allows step 242 to deposit a layer of gap material atop the trailing edge of the write pole. Decision 244 evaluates if the downtrack gap material is to be shaped into a letterbox region. If so, step 246 shapes the gap material to have a wider width than the collective write pole and gap distance, as illustrated in FIG. 4. A determination that no letterbox is to be formed advances routine to step 248 where the gap material is planarized a predetermined distance downtrack from the trailing edge of the write pole.

A front shield seed layer is subsequently formed in step 250 with a uniform or varying thickness. The material selection of the seed layer corresponds with the shielding layer deposited in step 252 to have low magnetic permeability, high coercivity, and large grain size with an acceptable magnetic moment. Although not limiting, the magnetic coercivity for a hard axis of the shielding layer can be configured to be 0.5 Oe or more and the easy axis coercivity of the shielding layer can be 4 Oe or more.

It is noted that the various steps and decisions of routine 230 are not limiting or required and any aspect can be amended or removed just as any step or decision can be added. For example, at least one additional step can be added that shapes the trench defined by the side shields after step 238 or a step can be added that forms one or more seed layers in the write pole trench prior to step 240 filling the trench with magnetic write pole material.

With the various embodiments of the seed and shielding layers of the front shield, a data writer can be tuned to provide increasingly magnetically hard materials that are conducive to data storage environments with large data capacity and high data density. The ability to customize the magnetic characteristics of the front shield by tuning the material and shape of the seed layer allows the front shield to be customized to a variety of data storage environments. Moreover, a customized front shield with low magnetic permeability, high magnetic coercivity, and large grain sizes can allow increased data track density by mitigating the risk of on-track and off-track erasure conditions occurring.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a write pole separated from a front shield by a non-magnetic gap layer, the gap layer extending into a letterbox region of the front shield, the front shield comprising seed and shielding layers with the shielding layer having an easy axis coercivity along a first direction of 4 Oe or more and a hard axis coercivity along a second direction of 0.5 Oe or more.

2. The apparatus of claim 1, wherein the seed layer has a grain size of 75 nm or more.

3. The apparatus of claim 1, wherein the shielding layer comprises a first FeCo material.

4. The apparatus of claim 3, wherein the seed layer comprises a second FeCo material with lower easy and hard axis coercivities than the first FeCo material.

5. The apparatus of claim 1, wherein the seed layer comprises FeCoHf.

6. The apparatus of claim 1, wherein the seed layer comprises a lamination of multiple Alumina sub-layers.

7. The apparatus of claim 6, wherein the lamination of multiple Alumina sub-layers comprises two sub-layers.

8. The apparatus of claim 6, wherein the lamination of multiple Alumina sub-layers comprises four sub-layers.

9. The apparatus of claim 1, wherein the seed layer has an anisotropy field of 20-28 Oe.

10. An apparatus comprising a write pole separated from a front shield by a non-magnetic gap layer, the gap layer extending into a letterbox region of the front shield, the letterbox region disposed between the write pole and the front shield, the front shield comprising seed and shielding layers with the shielding layer having an easy axis coercivity along a first direction of 4 Oe or more and a hard axis coercivity along a second direction of 0.5 Oe or more.

11. The apparatus of claim 1, wherein the shielding layer continuously extends across the letterbox region to contact first and second side shields.

12. The apparatus of claim 10, wherein the write pole and gap layer have a collective first width on an air bearing surface (ABS), the letterbox region having a second width that is greater than the first width.

13. The apparatus of claim 10, wherein the seed layer continuously extends about three different surfaces of the letterbox region.

14. The apparatus of claim 10, wherein the letterbox region has a rectangular shape.

15. The apparatus of claim 10, wherein the letterbox region is filled with a non-magnetic material.

16. An apparatus comprising a write pole separated from a front shield by a non-magnetic gap layer, the front shield comprising seed and shielding layers with the shielding layer having an easy axis coercivity along a first direction of 4 Oe or more and a hard axis coercivity along a second direction of 0.5 Oe or more, the seed layer being symmetric about a longitudinal axis of the write pole and continuously extending a first width on an air bearing surface (ABS) that is equal to or less than a second width of a collective width of write pole and gap layer.

17. The apparatus of claim 16, wherein the shielding layer has a varying thickness on the ABS, the thickness measured perpendicular to the width on the ABS.

18. The apparatus of claim 16, wherein the seed layer has a varying thickness along the first width, the thickness measured perpendicular to the width on the ABS.

19. The apparatus of claim 16, wherein the seed layer has a uniform thickness along the first width, the thickness measured perpendicular to the width on the ABS.

20. The apparatus of claim 16, wherein the shielding layer contacts multiple different surfaces of the seed layer on the ABS.

* * * * *